United States Patent [19]
Reischl

[11] Patent Number: 4,749,496
[45] Date of Patent: Jun. 7, 1988

[54] PROCESS FOR REMOVING IMPURITIES FROM MIXTURES OF WATER WITH WATER-MISCIBLE SOLVENTS

[75] Inventor: Artur Reischl, Leverkusen, Fed. Rep. of Germany

[73] Assignee: Bayer Aktiengesellschaft, Leverkusen, Fed. Rep. of Germany

[21] Appl. No.: 885,108

[22] Filed: Jul. 14, 1986

[30] Foreign Application Priority Data

Jul. 23, 1985 [DE] Fed. Rep. of Germany ....... 3526181

[51] Int. Cl.⁴ .................. C02F 1/28; B01D 15/00
[52] U.S. Cl. .................... 210/692; 210/660; 210/680; 210/502.1; 264/37; 264/182; 264/206
[58] Field of Search ............... 210/660, 679, 680, 689, 210/690, 691, 692, 693, 694, 502.1; 264/37, 38, 182, 206

[56] References Cited

U.S. PATENT DOCUMENTS

| | | | |
|---|---|---|---|
| 1,056,800 | 3/1913 | Krause | 210/502.1 |
| 3,334,042 | 8/1967 | Teitsma | 210/689 |
| 3,687,297 | 8/1972 | Kuhn | 210/502.1 |
| 3,812,031 | 5/1974 | McCoy | 210/680 |
| 3,888,766 | 6/1975 | De Young | 210/680 |
| 4,025,689 | 5/1977 | Kobayashi | 210/679 |
| 4,104,160 | 8/1978 | Wegmuller | 210/502.1 |
| 4,190,696 | 2/1980 | Hart | 210/502.1 |
| 4,302,335 | 11/1981 | Habermas | 210/689 |
| 4,395,332 | 7/1983 | Klein | 210/502.1 |

FOREIGN PATENT DOCUMENTS

| | | | |
|---|---|---|---|
| 1184857 | 4/1985 | Canada | 210/502.1 |
| 2820732 | 11/1979 | Fed. Rep. of Germany | 210/502.1 |
| 2158057 | 4/1984 | United Kingdom | 210/502.1 |

Primary Examiner—Ernest G. Therkorn
Attorney, Agent, or Firm—Gene Harsh; Joseph C. Gil; Lyndanne M. Whalen

[57] ABSTRACT

Mixtures of water with water-miscible solvent(s) containing suspended, emulsified and/or colloidal impurities are purified by contacting the water-solvent mixture with an at least partially open celled foam containing 1-75 weight percent active pulverulent additives. The liquid and solid phases are then separated. The active pulverulent additives which may be incorporated into the foam by means of a binder or by incorporation in the reactants used to form the foam include active coals, brown coal dust, peat, iron oxides and brown coal coke dust.

8 Claims, 1 Drawing Sheet

PROCESS FOR REMOVING IMPURITIES FROM MIXTURES OF WATER WITH WATER-MISCIBLE SOLVENTS

BACKGROUND OF THE INVENTION

This invention relates to a new process for removing suspended, emulsified and/or colloidally-dissolved solid or liquid impurities from mixtures of water with water-miscible solvents.

Organic solvents diluted with water are formed in the chemical industry in many product areas. For example, in the production of dyes or in the production of synthetic fibers such as elastic polyurethane fibers or polyacrylonitrile fibers which are spun from organic solution, the product dye or fiber contains residual quantities of solvent. This residual solvent is washed out by means of water. Mixtures of water and solvent are thus formed. These mixtures which have a water content of from 75 to 99 weight percent (generally, from 85 to 97 weight percent) not only contain the washed out solvent but also impurities arising from production. In the case of production of polyacrylonitrile fibers, these impurities include plasticizers such as stearyl phosphates, polyalkylene polyethers, other emulsifiers, mineral oils, lubricating oils and silicone oils, fatty alcohols, pigments and/or fiber dust. These impurities are generally present in the water-solvent mixture in suspended, emulsified and/or colloidally-dissolved form. For an economical fiber production, however, it is desirable to recover the solvent present in the mixtures and reuse it in the spinning process. Working-up by distillation of the mixtures containing the impurities is generally very difficult because during distillation the impurities are deposited as crusts on the inside walls of the distillation apparatus and thus hinder or even prevent the transfer of heat. Thus it has so far been necessary (particularly in the case of greatly polluted mixtures of water and solvent) to dispense with working-up by distillation, and to subject these mixtures to the biological purification of waste water. Such measures result not only in the overloading of existing sewage plants but also in a loss of solvent.

Removal of such impurities by filtration has also been unsatisfactory because the use of sand and of mixed media filtration materials and of special cloth filters for removing these impurities has been shown to be unsuitable, even with simultaneous use of flocculents.

The use of polyurethane foam particles for removing suspended solids from liquids, particularly water, described in EP-A No. 00 77 411 is also unsuitable.

SUMMARY OF THE INVENTION

It is an object of the present invention to provide a process which effectively removes suspended, emulsified and/or colloidally-dissolved solid or liquid impurities from mixtures of water with water-miscible solvents This object and others which will be readily apparent to those skilled in the art is accomplished by contacting the impurity-containing mixture of water with solvent with an at least partially open celled foam. This foam contains from 1-75 weight percent (based on total dry solids weight) pulverulent additives. The liquid mixture which has thus been freed of impurities is then separated from the solid foam phase.

BRIEF DESCRIPTION OF THE DRAWING

The drawing is a schematic representation of a filter column suitable for the practice of the present invention.

DETAILED DESCRIPTION OF THE INVENTION

Figure 1:
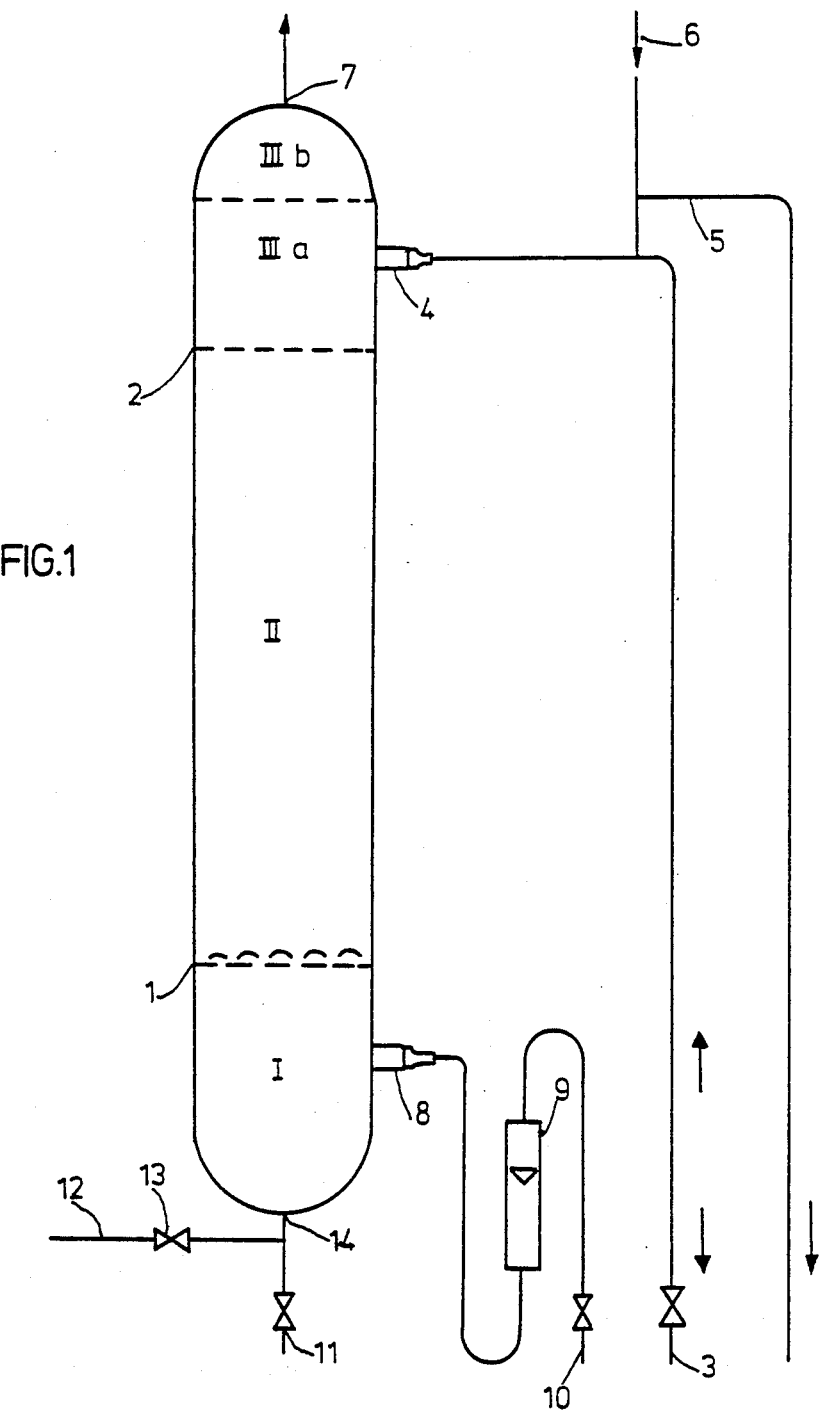

This invention provides a process for removing suspended, emulsified and/or colloidally-dissolved solid or liquid impurities from mixtures of (i) water with (ii) water-miscible solvents in which the mixtures to be purified are brought into contact with at least partially open-cell foams having active adsorbing pulverulent additives in a quantity of from 1 to 75 weight percent (based on the total dry solids weight) incorporated therein. The liquid phase is then separated from the solid phase. The adsorbent materials may be fixed in the foam by a means of a polymeric binder or may be incorporated during production of the foam by mixing that adsorbent material with at least one of the starting materials used in the production of foam.

The mixtures to be purified in the process of the present invention are mixtures of (i) water with (ii) water-miscible solvents, particularly with dimethyl formamide and/or dimethyl acetamide. These mixtures to be purified generally contain from about 75 to 99 weight percent (preferably from about 85 to 97 weight percent) water, from about 0.5 to 25 weight percent (preferably from about 2.5 to 15 weight percent) solvent and up to about 2.5 weight percent (generally from about 0.002 to 0.4 weight percent) impurities. These impurities are, however, concentrated, by distillation as explained in the example. In spite of their low concentration, these impurities do cause problems.

The foams used in the present invention as "filters" are plastics which may be produced by polymerization, polycondensation or polyaddition. The foams must, however, be at least partially open celled, preferably at least 50%, most preferably more than 80% open-celled. Elastic, predominantly open-cell polyurethane foams or polyurethane foam waste with an (average) density in an uncharged state of from 10 to 200 (preferably from 15 to 100) kg/m$^3$ are used predominantly.

The foams to be used in the process of the present invention are charged with active adsorbing pulverulent additives in quantities such that these additives amount to from 1 to 75 weight percent, preferably from 10 to 55 weight percent, based on the total dry solids weight.

Suitable active adsorbing, pulverulent additives include: active coals, brown coal dust, peat, iron oxides, particularly iron (III)-oxides and brown coal coke dust. Preferred active adsorbing additives are active coal and brown coal dust. Other active adsorbing additives, such as kieselguhr, silicas or aluminum oxides can optionally be used in addition to the above-named, more suitable additives. Where these optional active adsorbing additives are used, the total quantity of all of the active adsorbing additives should be from 1 to 75 weight percent, preferably from 10 to 55 weight percent, based on total dry solids weight. It is preferred that those foams in which both optional and preferred active adsorbing additives are present contain the preferred additive(s) in a quantity which is at least 30 weight percent of the additives used.

The active adsorbing additives are fixed or incorporated in or on the cell webs of the foam. The additives may be fixed by means of a polymeric binder.

Polymers of olefinically unsaturated monomers act as a binder for the active adsorbing additives. These polymers are preferably used in the form of the aqueous dispersions. Polyurethanes (preferably a polyisocyanate prepolymer), optionally as an aqueous emulsion or as an aqueous polyurethane dispersion may also be used. Suitable polymer dispersions include natural rubber latex, styrene-butadiene-latex, butadiene-acrylonitrile(acrylate-) latex, polyvinyl acetate latex with optionally partially saponified ester groups (polyvinyl acetate-polyvinyl alcohol polymers) and similar dispersions known in polymer chemistry. The polymers may be non-ionic or they may contain anionic and/or cationic groups in the macromolecule or emulsifiers.

Suitable binders based on polyurethane include: NCO prepolymers such as those obtained in known manner by reacting excess quantities of organic diisocyanates (such as 2,4- and/or 2,6-diisocyanato-toluene) with high molecular weight polyhydroxyl compounds having a hydroxyl functionality of from 2 to 3 (particularly polyhydroxy polyethers in the molecular weight range of from 1000 to 6000) at an NCO/OH equivalent ratio of from 1.3:1 to 3:1. Those NCO prepolymers which contain incorporated cationic groups or groups which can be converted into cationic groups (e.g., tertiary nitrogen atoms or ammonium groups are often preferred. These preferred NCO prepolymers may be obtained by using polyether polyols containing tertiary nitrogen atoms (e.g. the propoxylation products of N-methyldiethanol amine) in their production. Amino alcohols in admixture with nitrogen-free polyether polyols may also be used in the production of these preferred NCO prepolymers. Low molecular weight di- and polyisocyanates can additionally be contained in the NCO prepolymers in an amount up to about 50 weight percent based on all the isocyanato compounds. The conversion of the tertiary nitrogen atoms to ammonium groups can take place subsequent to the prepolymer formation by alkylation agents such as dimethyl sulphate or by reacting in situ the tertiary nitrogen atoms with acidic groups present in the active adsorbing additives (e.g., humic acids in brown coal or peat). Such cationic NCO prepolymers generally have a tertiary nitrogen atom or ammonium group content of from 10 to 1000, preferably from 50 to 5000 milliequivalents per 1000 g of prepolymer.

Other binder's based on polyurethanes suitable in making the foams employed in the process of the present invention include the known aqueous polyurethane dispersions which preferably have chemically-fixed cationic groups. The content of cationic groups is generally from 10 to 1000, preferably from 50 to 5000 milliequivalents per 1000 grams of prepolymer. Such cationic polyurethane dispersions may be obtained, for example, by methods disclosed in U.S. Pat. No. 3,479,310 or British patent No. 1,076,688.

The polymer and polyurethane dispersions generally have a solids content of from 10 to 55 weight percent, preferably from 20 to 45 weight percent.

The foams to be used in the process of the present invention having active adsorbent additives fixed with polymer or polyurethane dispersions are generally produced in a manner such that the foam to be charged, the additive and the dispersion are thoroughly mixed with each other. The individual components are used in quantities such that in the mixtures, based on solids, from 5 to 85 (preferably, from 5 to 60) weight percent of foam, from 1 to 75 (preferably, from 10 to 55) weight percent of additive and from 2 to 60 (preferably, from 10 to 40) weight percent of binder are present. These percentages in each case add up to 100. Additional water may optionally be added during the thorough mixing of the components. The total water content of the mixture before coagulation is from 20 to 80 (preferably, from 40 to 60) weight percent, based on the total mixture. Subsequent to the thorough mixing, the coagulation of the binder is ensured. This can take place, for example, by adding a coagulant and/or by heat treatment of the mixture. Suitable coagulants include: calcium chloride, magnesium sulphate, sodium chloride, hydrochloric acid, sulfuric acid or acetic acid in a 2 to 5 weight percent aqueous solution. For coagulation, the coagulant is mixed in with the mixture in a quantity of, for example, from 0.1 to 5 weight percent, based on the solids of the coagulant and the solids of the dispersion to be coagulated. Subsequent to the addition of the coagulant, the mixing output of the mixing assembly used is generally choked and the coagulation is preferably accelerated by heating the mixing product to from about 60° to 100° C. Subsequent to the coagulation, the foams to be used in the process of the present invention are obtained in the form of water-containing granulates. The particle size of these granulates corresponds to the particle size of the starting foams used and is generally from 2 to 30 mm.

Where NCO prepolymers are employed in making the foams used in the process of the present invention, the thorough mixing is carried out in the same manner as described above. If non-ionic, hydrophobic NCO prepolymers are used, the addition of a coagulant would serve no purpose. A coagulant would therefore be superfluous.

The fixing of the additive by the binder takes place as a result of the spontaneously occurring NCO/water reaction. When using cationically-modified NCO prepolymers, this fixing of the additive to the foam can be accelerated or improved by adding a coagulant. When using NCO prepolymers, an often undesirable additional cell formation can take place due to the formation of carbon dioxide during the NCO/water reaction. The foams thus obtained are combination foams. Even when using NCO prepolymers, the particle size of the resulting charged foams corresponds to the desired particle size of the foam to be used and is from 2 to 30 mm. In special cases, the solidification may take place under the application of pressure. The composite foam thus obtained is then crushed.

In the second method for production of the charged foams to be used in the process of the present invention, the fixing of the additives takes place by incorporation in the foam structure. This can be done, for example, by mixing the additives with water and NCO prepolymers of the type previously described (particularly with NCO prepolymers having incorporated tertiary nitrogen atoms or with incorporated ammonium groups), preferably with addition of foam stabilizers. A charged foam which is suitable for the process of the present invention forms spontaneously. This foam is divided into granulates with a particle size of from 2 to 30 mm subsequent to the chemical reaction by mechanical crushing. The ratios of the materials used to produce these foams such that, based on the sum of NCO prepolymer plus additive, from 30 to 50 weight percent NCO prepolymer and from 50 to 70 weight percent active adsorbing additives are present. The water content of the mixture is in the same range as in the embodiment in which the additives are fixed by means of a polymeric binder.

In carrying out the process of the present invention, the mixture to be purified is brought into contact with the charged foams, optionally after addition of from about 30 to 150 ppm (weight), based on waste water, of a precipitation agent (for example, "purifying auxiliary 44009 A" by Bayer AG, Leverkusen) which precipitates in a very finely dispersed manner a proportion of the originally suspended, emulsified and/or colloidally-dissolved impurities. A method of operation which is particularly well suited for this process employs a filter column such as that which is schematically shown in the Figure. In this Figure, the reference numerals identify the following:

I: lower sealing cap of the filter column;
II: cylindrical glass tube which serves to absorb the modified foam;
III: upper sealing cap of the filter column;
IIIa: section of the upper sealing cap filled with liquid;
IIIb: gas-filled section of the upper sealing cap;
(1): a bubble plate;
(2): a perforated plate;
(3): inlet conduit with valve for the mixture to be purified or outlet conduit during subsequent rinsing;
(4) : inlet position for mixture to be purified:
(5) : overflow conduit;
(6) : aeration opening;
(7) : aeration opening;
(8) : outlet position for purified mixture;
(9) : flow meter;
(10) : valve;
(11) : drain valve and conducting valve for rinsing water;
(12) : inlet conduit for compressed air;
(13) : inlet valve for compressed air;
(14) : inlet position for rinsing water and compressed air.

In carrying out the process of the present invention, the middle section II of the filter column is filled with the foam granulate in a quantity which is up to about 50 to 80% by volume. The mixture to be purified is then passed via (4) from top to bottom through the middle space II partially filled with foam and removed from the column via (8), (9) and (10). The measurements of the column, the quantity of foam and the throughflow quantity are selected so that the average residence time on the foam of the mixture to be purified is from 1 to 30 (preferably from 2 to 15) minutes. The temperature in the column is preferably from about 15° to 50° C, with the upper temperature limit being dependent upon the characteristic temperature of the mixture to be purified.

The filter column can be operated until the mixture of water and solvent being discharged shows the first signs of cloudiness. The process of the present invention makes possible practically complete elimination of the impurities which complicate the working-up by distillation of the water-solvent mixtures (crust formation on the inside wall of the distillation apparatus), although the total content of non-volatile impurities of the mixtures used (evaporation residue) is often only reduced by from 20 to 40%.

The process of the present invention can be continued until the first signs of cloudiness are seen in the purified mixture being discharged. The process of the present invention is stopped at this point, if not sooner, to regenerate the filter column. In addition, the impurities deposited on the foams may be precipitated by passing water, preferably mixed with compressed air, upwards from the bottom through the column. The flow ratios are selected such that the foam granulates undergo substantial turbulence and are completely freed from the collected impurities. The filter composition regenerated in this manner can immediately be reused in accordance with the invention. A further mechanical purification of the filter compositions is, in any case, not necessary.

The invention is further illustrated but is not intended to be limited by the following examples in which all parts and percentages are by weight unless otherwise specified.

EXAMPLE

Apparatus and Method of Operation (See The Figure)

A vertical filter column, made up of a cylindrical glass tube II with an inside diameter of 600 mm and a height of 2000 mm and two sealing caps I and III each 8000 mm in height, each having an axial (7) and (14) and a side (4) and (8) opening is divided by a lower bubble plate (1) and an upper perforated plate (2) into the lower filter space I , the middle filter space II and the upper filter space III (the latter made up of IIIa and IIIb). The bubble plate (1) is a commercial standard built-in component for sand filters and is tipped with slotted bubble caps with a diameter of 40 mm (30 bubble caps, slot height 10 mm, slot width 1 mm).

The upper perforated plate (2) is a perforated sheet with holes with a hole diameter of 2.5 mm. The filter space between the bubble plate (1) and the perforated plate (2) serves to absorb the filter bed made up of the charged granulated foam to be used according to the invention, which is deposited in water (the charged foams to be used according to the invention generally have a density above 1 g/cm$^3$). be purified is mixed with a purifying auxiliary and filled into the upper filter space IIIa by means of a pump, via the valve (3) and the inlet tube (4). The overflow conduit (5) provided with an aeration opening (6) is fitted such that a negligibly small excess quantity of waste water always overflows and a constant level is maintained in the upper filter space IIIa. The filter column is aerated at the vent (7) via the air cushion of the upper filter space IIIb. After flowing through the filter bed, the purified waste water solution enters the lower filter space I and leaves the filter apparatus as regenerated solution via the outlet tube (8), the flow meter (9) and the valve (10).

If after a filter cycle, the polluted filter composition is to be freed from the adhering pollutants, then the metered addition of the waste water is stopped and the supply to the valve (3) is interrupted. The filter is emptied via the outlet valve (10) and the drain valve (11) and the filter spaces I and II are filled up to the upper perforated plate (2) with fresh water via (13) and (14) in the reverse flow direction from the bottom towards the top. Depending on the manner in which the process is conducted, the regeneration of the filter can also take place with regenerated solution or waste water solution. In this case, the previous emptying is unnecessary. Compressed air is now passed into the lower filter space I via the conduit (12) and the valve (13). The air passes over into the filter space II through the slots of the bubble plate (1), loosens the filter bed and finally churns the filter composition with the water.

When the filter bed has been loosened and the turbulent motion is in process, further fresh water or waste water solution is supplied and the loosened pollutants are rinsed from the filter bed via the conduit (4) and the valve (3). The progress of the purification can thereby be followed via sediment formation in a sample of the discharge. If the sediment formation approaches zero, then the purification is finished and the supply of rinsing water is stopped. After sedimentation of the regenerated foam, the apparatus is again ready for use.

Execution of the Process

Production of the foam used for filtration

The production of the foam takes place continuously in a double paddle worm trough. The total throughput is about 1.5t/h. In this worm trough, the following constituents are mixed: 25 parts by weight (dry solids weight) of a polyether-PUR-waste foam (flake size 1 to 12 mm, average bulk density 23 kg/m$^3$, bulk weight 14 g/l, more than 80% open cells); 50 parts by weight, based on dry solids weight, of brown coal dust with an average particle size of less than 100 μm and a residual moisture content of 7 weight percent; 25 parts by weight, based on dry solids weight, of a cationic polyether-polyurethane prepolymer with terminal isocyanate groups having an NCO content of 5.6 weight percent, a content of ammonium groups of 120 milliequivalents/1000 g, a viscosity at 25° C. of 9500 mPa.s, produced from 20 parts by weight of a mixture of 2,4- and 2,6-diisocyanato-toluene (weight ratio=80:20), 41.9 parts by weight of a polyether polyol I, 35 parts by weight of a polyether polyol II, 1.5 parts by weight of N-mehtyldiethanolamine and 1.5 parts by weight of dimethyl sulphate; and 100 parts by weight of water. Polyether polyol I is a polyether polyol with the OH number 28, produced by propoxylation of trimethylol propane and subsequent ethoxylation of the propoxylation product (weight ratio PO:EO=80:20); polyether polyol II is the propoxylation product of 1,4-dihydroxy butane with the OH number 56.

A double paddle worm trough with a capacity of about 180 l and a length of about 300 cm, the paddle shafts of which rotate in counter rotation was used to produce the mixture. The transportation of the product took place from the inlet opening in the direction of the outlet opening, whereby a certain kneading or crushing of the reaction mixture took place. The polyurethane foam crushed below 12 mm and the brown coal dust were separately conveyed into the worm trough via metering worms. At the same position, the water was delivered via reciprocating pumps and the NCO prepolymer by means of gear pumps. It was useful, but not necessary to intensively mix the cationic NCO prepolymer with about twice the quantity of water at from about 10° C. to 25° C. in a throughflow mixer or static mixer within a few seconds. The previously dried brown coal dust was thereby extremely quickly and evenly wetted with the separately metered residual quantity of the water heated to 50° C. and the NCO prepolymers in the most finely-divided form evenly encased the solids and foams.

After a residence time in the worm trough of from 2 to 3 minutes, the mixture was discharged in containers half-filled with water through an opening situated underneath at the end of the trough and washed with water on a carrier belt of steel netting.

The resulting foam material had an open-pore structure and immediately settled out in water. In an aqueous suspension, the material had a dry solids weight content (TS) of 59 kg/m without supernatant water.

Waste Water Purification

The waste water regenerated was process water from the polyacrylonitrile fiber production which contained dimethyl formamide to be recovered in a concentration of 9.8 weight percent. The following were present as dissolved, emulsified and suspended impurities: inorganic salts, salts of amines and carboxylic acids, dissolved dyes, emulsifiers, mineral oil, machine oil, fatty alcohol and the derivatives thereof, fatty acids and the derivatives thereof, color pigments and fiber waste. These impurities were present in the process water in a total quantity of from 550 g/m to 802 g/m$^3$. These quantities can be determined as evaporation residue.

Into the waste water flow of 2 m$^3$/h to be purified was metered by an external metering pump (not shown) at a rate of 7,3l/h (which rate is dependent upon the content of dissolved impurities in the waste water) a cationic purifying agent (purifying auxiliary 44009 A, producer: Bayer AG), in a quantity of from 30 to 150 ppm of solids, based on waste water. After flowing through a residence time vessel (from 10 to 30 minutes residence time, not shown) the waste water was supplied for the filtration according to the invention.

The suspension volume before carrying out the experiment (in water) was 0.45 m$^3$, corresponding to 26.55 kg of dry solids weight of the modified foam. The suspension volume after carrying out the experiment (in water) was 0.31 m$^3$, corresponding to 26.55 kg of dry solids weight. It follows from this that the volume contraction of the filter bed over the total time period of the experiment (16 hours) was 31%.

The process parameters were as follows:
Waste water supply: 2.2 m$^3$/h:
Average residence time in the filter space II: 15 minutes.
Average contact time with foam: 7 to 10 minutes.

With 26.55 kg of dry solids weight of foam, a total of 35.2 m$^3$ of waste water were purified in the course of 16 hours.

Dimethylformamide (DMF) Content and Evaporation Residue

The DMF content was determined by means of the refraction coefficient at 20° C. by evaluating a calibration curve. The evaporation residue was determined by evaporation under vacuum and drying the residue at 105° C./26 mbar. The results of these determinations are given in the following Table.

TABLE

| Duration of experiment (h) | Waste water DMF content % | Evaporation residue mg/l | Purified DMF content % | H$_2$/DMF mixture evaporation residue mg/l | Rate of elimination % |
|---|---|---|---|---|---|
| 1 | 9.8 | 650 | 9.8 | 485 | 25.4 |
| 4.5 | 9.8 | 700 | 9.8 | 500 | 28.5 |
| 7.5 | 9.8 | 802 | 9.8 | 601 | 25.0 |
| 12 | 9.8 | 550 | 9.8 | 398 | 27.2 |

TABLE-continued

| Duration of experiment (h) | Waste water DMF content % | Evaporation residue mg/l | Purified DMF content % | $H_2$/DMF mixture evaporation residue mg/l | Rate of elimination % |
|---|---|---|---|---|---|
| 14 | 9.8 | 601 | 9.8 | 452 | 25.0 |
| 16 | 9.8 | 750 | 9.8 | 451 | 26.7 |

The fluctuations in the evaporation residue in the waste water were due to the fact that the waste water was from a continuous production process, the content of evaporation residue of which is constantly changing. Although the elimination of the impurities was only at most 28.5%, the purified mixture of water and dimethyl formamide could be converted without difficulty by distillation into a concentrate, which contained about equal parts by weight of water and dimethyl formamide without any deposits being observed on the distillation apparatus. The production of a corresponding concentrate using the non-filtered waste water once resulted in substantial deposits on the inside walls of the distillation apparatus, such that the walls had to be thoroughly cleaned after an operation duration of about 2 months. With the further working-up by distillation of the concentrate, which generally results from the spinning process after mixing the concentrate with highly concentrated DMF, far fewer disturbances of the distillation process occurred in the case of the mixtures purified according to the invention than in the case of the waste waters not treated according to the invention. Generally up to 75% of the previously usual interruptions in the distillation process are avoided.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for removing suspended, emulsified and/or colloidal impurities from mixtures of water-miscible solvents in which the water-solvent mixture to be purified is a mixture of water with dimethyl formamide and/or dimethyl acetamide with a water content of from 75 to 99 weight percent which comprises
    (a) the water-solvent mixture to be purified, is brought into contact with an at least partially open celled foam in which 1-75 weight percent (based on total dry solids weight) active pulverulent additive have been incorporated and
    (b) the liquid thus freed from the impurities is then separated from the foam.

2. The process of claim 1 in which the water-solvent mixture to be purified (a) is passed through a column in which the foam containing active pulverulent additives is present and (b) the mixture freed from impurities is removed at the column outlet.

3. The process of claim 1 in which the foam used in (a) is in the form of particles having an average diameter of from 2 to 30 mm.

4. The process of claim 1 in the foam used in (a) is an elastic polyurethane foam or polyurethane foam waste having at least 50% open cells and a density of from 10 to 200 kg/m$^3$ before incorporation of the active pulverulent additive.

5. The process of claim 1 in which the active pulverulent additive is active coal and/or brown coal dust.

6. The process of claim 1 in which the active pulverulent additive is incorporated into the foam with a polymeric binder.

7. The process of claim 6 in which the polymeric binder is a polymer of an olefinically unsaturated monomer or a polyurethane.

8. The process of claim 1 in which the water-solvent mixture to be purified was formed in the production of polyacrylonitrile fibers.

* * * * *